US008499565B2

(12) United States Patent
Bland et al.

(10) Patent No.: US 8,499,565 B2
(45) Date of Patent: Aug. 6, 2013

(54) AXIAL DIFFUSOR FOR A TURBINE ENGINE

(75) Inventors: Robert Bland, Oviedo, FL (US); John Battaglioli, Ballston Lake, NY (US)

(73) Assignee: Siemens Energy, Inc., Orlando, FL (US)

( * ) Notice: Subject to any disclaimer, the term of this patent is extended or adjusted under 35 U.S.C. 154(b) by 869 days.

(21) Appl. No.: 12/572,043

(22) Filed: Oct. 1, 2009

(65) Prior Publication Data

US 2010/0058768 A1 Mar. 11, 2010

Related U.S. Application Data

(63) Continuation-in-part of application No. 11/378,028, filed on Mar. 17, 2006, now abandoned.

(51) Int. Cl.

*F02C 3/04* (2006.01)
*F23R 3/42* (2006.01)
*F23R 3/54* (2006.01)

(52) U.S. Cl.

USPC ................. 60/751; 60/752; 60/39.37; 60/760

(58) Field of Classification Search

USPC ................................ 60/39.37, 751, 752, 760
See application file for complete search history.

(56) References Cited

U.S. PATENT DOCUMENTS

| | | | | |
|---|---|---|---|---|
| 3,759,038 | A | | 9/1973 | Scalzo et al. |
| 3,768,919 | A | | 10/1973 | O'Connor |
| 3,832,089 | A | | 8/1974 | Moellmann |
| 3,879,939 | A | | 4/1975 | Markowski |
| 3,978,658 | A | | 9/1976 | Forbes et al. |
| 4,530,639 | A | | 7/1985 | Mowill |
| 4,597,530 | A | | 7/1986 | Goudy, Jr. et al. |
| 4,719,748 | A | | 1/1988 | Davis et al. |
| 5,110,560 | A | * | 5/1992 | Presz et al. .................... 422/176 |
| 5,592,820 | A | * | 1/1997 | Alary et al. ..................... 60/751 |
| 5,630,703 | A | | 5/1997 | Hendley et al. |
| 5,714,819 | A | | 2/1998 | Gilliland et al. |
| 6,037,688 | A | | 3/2000 | Gilliland et al. |
| 6,200,094 | B1 | | 3/2001 | Skoch et al. |
| 6,553,763 | B1 | | 4/2003 | Callas et al. |
| 6,672,070 | B2 | | 1/2004 | Bland et al. |
| 2001/0032453 | A1 | | 10/2001 | Tatsumi et al. |
| 2004/0115044 | A1 | | 6/2004 | Osako et al. |

FOREIGN PATENT DOCUMENTS

| | | | |
|---|---|---|---|
| JP | 10141288 | A | 5/1998 |
| WO | 2004/101969 | A1 | 11/2004 |

* cited by examiner

*Primary Examiner* — Ted Kim

(57) ABSTRACT

A turbine engine having a plenum for passing fluids from an outlet of a compressor to an inlet of a combustor that may increase the efficiency of the turbine engine. The turbine engine may include a combustor, a compressor positioned upstream of the combustor, a transition channel extending from the compressor to the combustor, and a shell extending between the compressor and a combustor portal and positioned around the at least one transition channel. The turbine engine may also include an axial diffusor in the shell near the at least one transition channel, wherein the axial diffusor may include a fluid flow recess in a trailing edge of the axial diffusor. The turbine engine may also include a wave protrusion extending from a surface positioned radially inward of the axial diffusor. The fluid flow recess and the wave protrusion may reduce fluid flow loss within the shell.

20 Claims, 3 Drawing Sheets

AXIAL DIFFUSOR FOR A TURBINE ENGINE

CROSS-REFERENCE TO RELATED APPLICATION

This patent application is a continuation-in-part application of U.S. patent application Ser. No. 11/378,028, filed Mar. 17, 2006, which is incorporated by reference in its entirety.

FIELD OF THE INVENTION

This invention is directed generally to turbine engines, and more particularly to plenums for conducting compressed air from a compressor to a combustor of a turbine engine.

BACKGROUND

Typically, gas turbine engines include a compressor for compressing air, a combustor for mixing the compressed air with fuel and igniting the mixture, and a turbine blade assembly for producing power. Compressed air is supplied from the compressor to the combustor through a plenum formed by a shell surrounding a plurality of transition channels. The compressed air is passed through an often crude duct system between the compressor and the combustor that is often riddled with inefficiencies that reduce the efficiency of the turbine engine. The duct system has been configured in this manner so that the transition channels may be cooled with the compressed air while the compressed air is flowing to the combustor. Flow of the cooling fluids within this plenum is often controlled with an axial diffusor that directs the compressed air through an opening between the axial diffusor and the transition channel. Radial diffusors have been used to redirect the compressed gases between adjacent transition channels in turbine engines in which the transition channels are spaced sufficiently to enable use of the radial diffusors. However, in turbine engines without the sufficient space between adjacent transitions channels, radial diffusors are not an available option. Conventional systems often restrict flow between the axial diffusors and the transition channels, thereby resulting in increased compressed air velocity and increased flow losses. Thus, in systems in which axial diffusors are used, a need exists for a more efficient fluid flow configuration.

SUMMARY OF THE INVENTION

This invention relates to a turbine engine having a plenum for passing fluids such as, but not limited to, compressed air, from an outlet of a compressor to an inlet of a combustor that may increase the efficiency of the turbine engine. The turbine engine may include an axial diffusor in the plenum, wherein the axial diffusor may include a fluid flow recess in a trailing edge of the axial diffusor. The turbine engine may also include a wave protrusion extending from a surface forming a radially inward side of the axial diffusor. The fluid flow recess and the wave protrusion may reduce fluid flow loss within the plenum. In fact, in at least one example in which the fluid flow has been modeled, the instant invention reduced the plenum loss by about 20 percent.

The turbine engine may include a combustor, a compressor positioned upstream of the combustor, at least one transition channel forming at least a portion of a plenum between the compressor and the combustor, a shell extending between the compressor and a combustor portal that provides access to the combustor and is positioned around the at least one transition channel. The turbine engine may also include an axial diffusor extending generally axially toward the at least one transition channel. The axial diffusor may be coupled to other components to form a plenum in fluid communication with the compressor. The axial diffusor may include a fluid flow recess in a trailing edge of the axial diffusor.

The fluid flow recess may reduce losses that typically occur in the plenum and may increase the flow of fluids through the plenum. The fluid flow recess may be positioned in close proximity to an outer surface of the transition channel. The fluid flow recess may also be aligned generally with the transition channel. The fluid flow recess may be generally semicircular in shape, may be curved, or may have another shape. The fluid flow recess may extend into the axial diffusor between about 10 percent and about 50 percent of the axial length of the axial diffusor. The turbine vane may include a wave protrusion extending from a surface forming a radially inward side of the axial diffusor. The wave protrusion may increase the efficiency of the turbine engine by reducing fluid flow losses in the plenum. The wave protrusion may be aligned circumferentially with the fluid flow recess. The wave protrusion may be positioned axially upstream from the fluid flow recess such that the wave protrusion is generally aligned with the fluid flow recess. A lead-in fillet may be positioned at an intersection between the wave protrusion and surrounding components. In such a position, the cross-sectional area of the opening between the fluid flow recess and the wave protrusion may be about the same as a conventional configuration. However, the combination of the fluid flow recess and the wave protrusion provides enhanced fluid flow with reduced losses relative to a conventional configuration without the fluid flow recess, thereby increasing the efficiency of the turbine engine.

An advantage of this invention is that the combination of the fluid flow recess and the wave protrusion provides enhanced fluid flow with reduced losses, thereby increasing the efficiency of the turbine engine. In at least one example in which the fluid flow has been modeled, the instant invention reduced the plenum loss by about 20 percent.

Another advantage of this invention is that the fluid flow recess and the wave protrusion reduce the restrictions on fluid flow, thereby increasing the efficiency of the turbine engine by decreasing the peak flow velocity of the compressed air in the plenum between the compressor and the combustor.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
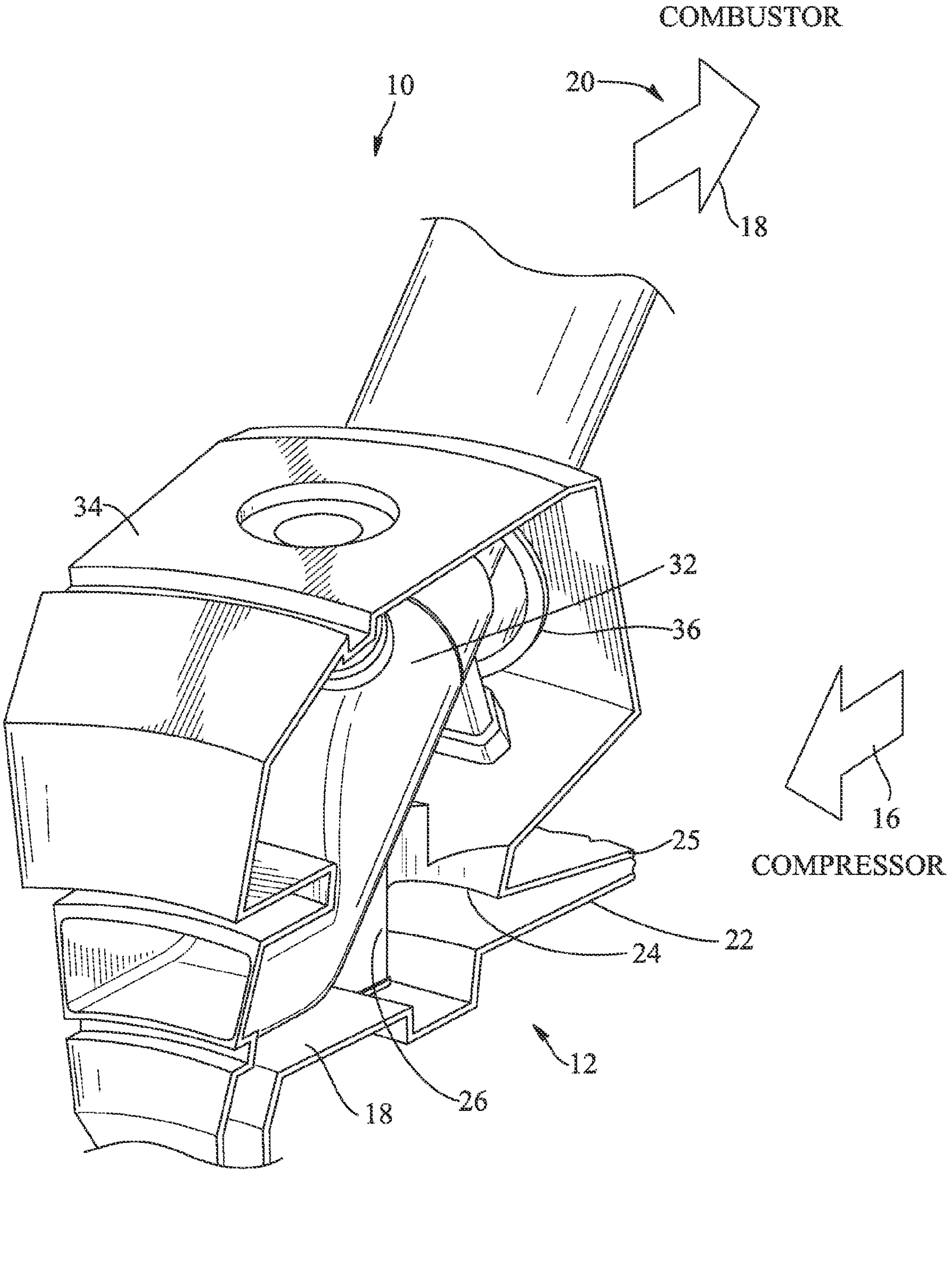
FIG. 1 is a perspective view of a plenum between a compressor and a combustor of a turbine engine having features according to the instant invention.
Figure 2:
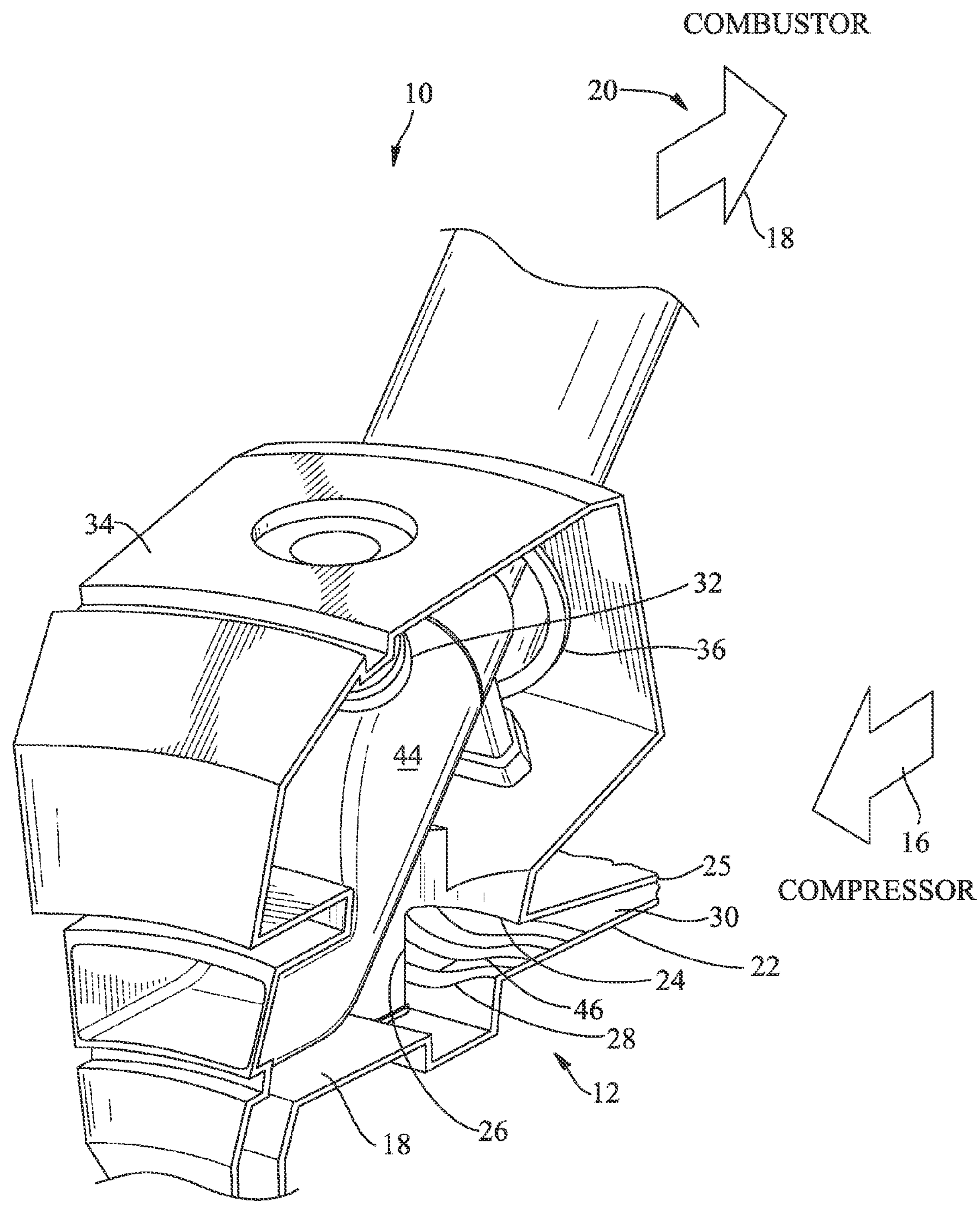
FIG. 2 is a perspective view of an alternative configuration of a plenum between a compressor and a combustor of a turbine engine having features according to the instant invention.
Figure 3:
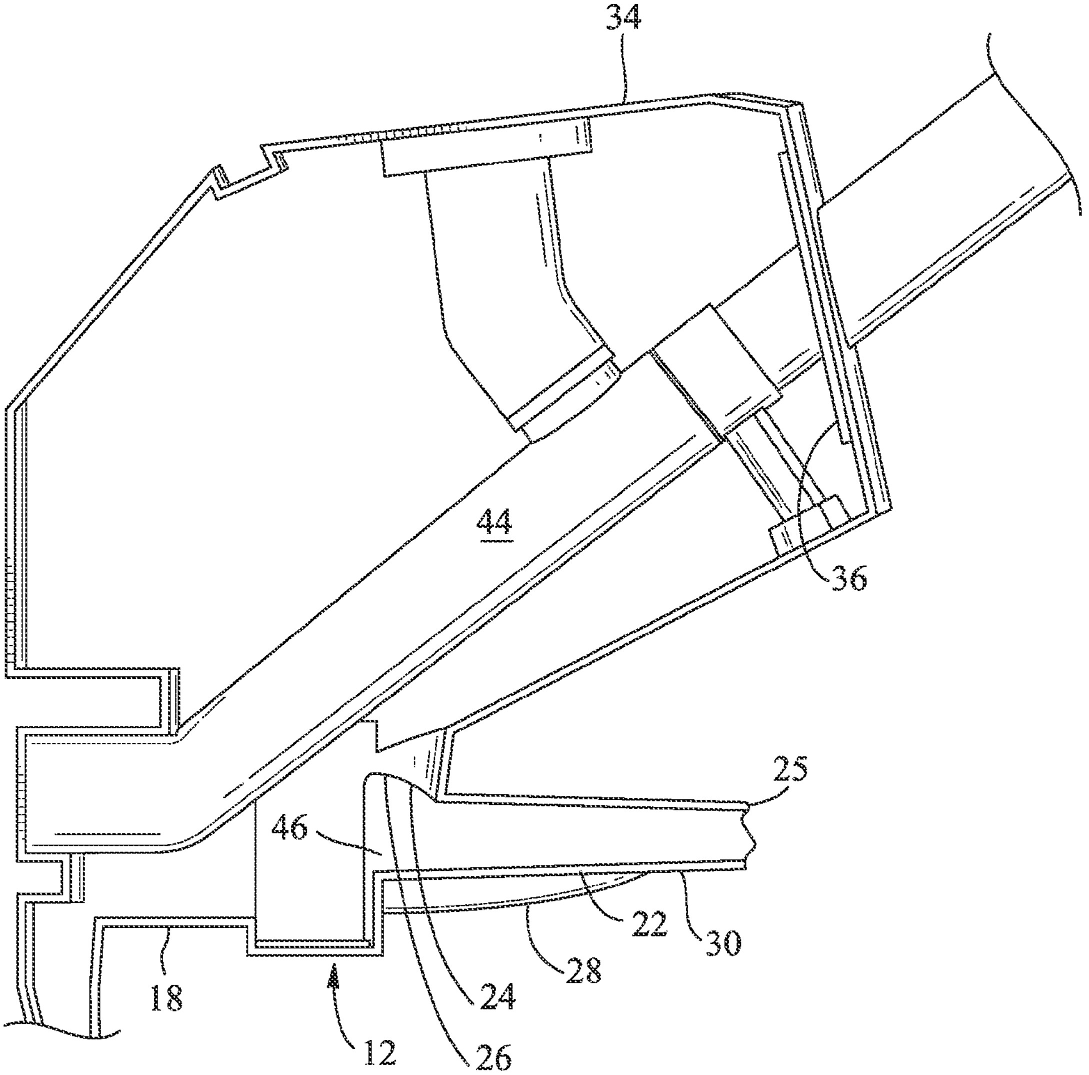
FIG. 3 is a side view of the plenum shown in FIG. 2.

As shown in FIGS. 1-3, this invention is directed to a turbine engine 10 having a plenum 12 for passing fluids such as, but not limited to, compressed air, from an outlet of a compressor 16 to an inlet 18 of a combustor 20 that may increase the efficiency of the turbine engine 10. The turbine engine 10 may include an axial diffusor 22 in the plenum 12, wherein the axial diffusor 22 may include a fluid flow recess 24 in a trailing edge 26 of the axial diffusor 22. The turbine engine 10 may also include a wave protrusion 28 extending from a surface 30 forming a radially inward side of the axial diffusor 22. The fluid flow recess 24 and the wave protrusion 28 may reduce fluid flow loss within the plenum 12 and provide significant increases in efficiency.

The turbine engine 10 may include a compressor 16 positioned upstream of the combustor 20, which may be formed from any appropriate configuration for supplying compressed gases, such as air, to the combustor 20. The compressor 16 may be formed from conventional compressors or other appropriate compressors unknown at this time. The turbine engine 10 may also include a combustor 20 positioned downstream from the compressor 16. The combustor 20 likewise may be formed from any appropriate combustor configuration for combusting fuel/gas mixtures. The turbine engine 10 may also include at least one transition channel 32 forming at least a portion of the plenum extending from the compressor 16 to the combustor 20. In at least one embodiment, the turbine engine may include a plurality of transition channels 32 extending circumferentially around the turbine engine 10 between the compressor 16 and the combustor 20. The transition channel 32 may be formed from any appropriate configuration, such as a conventional transition channel or other appropriate configurations. The turbine engine may also include a shell 34 forming a portion of the plenum between the compressor 16 and a combustor portal 36 of the combustor 20. The shell 34 may be around the transition channel 32, thereby forming a portion of the plenum 12 between the compressor 16 and the combustor 20. The shell 34 may be formed from any appropriate configuration, such as a conventional shell or other appropriate configurations.

The turbine engine 10 may also include axial diffusor 22 within the plenum 12. The axial diffusor 22 may extend axially and form a portion of a plenum positioned in fluid flow between the compressor 16 and the combustor 18. The axial diffusor 22, as the name implies, may extend axially within the plenum 12. The axial diffusor 22 may have a generally tapering cross-section. For instance, as shown in FIGS. 1 and 2, a cross-sectional area of the axial diffusor 22 may increase in size moving axially along the axial diffusor 22 from a first end 25 toward the trailing edge 26 of the axial diffusor 22.

The axial diffusor 22 may also include a fluid flow recess 24 in the trailing edge 26 of the axial diffusor 22. The fluid flow recess 24 may have be positioned on the radially outward trailing edge 26. The fluid flow recess 24 may reduce losses that typically occur in the plenum 12. The fluid flow recess 24 may also increase the flow of fluids through the plenum 12. The fluid flow recess 24 may be positioned in close proximity to an outer surface 44 of the transition channel 32, as shown in FIGS. 2 and 3. The fluid flow recess 24 may also be aligned generally with the transition channel 32. The fluid flow recess 24 may have various configurations for enhancing the efficiency of fluid flow through the plenum 12, such as, but not limited to, triangular, sinusoidal, and other shapes. In at least one embodiment, as shown in FIGS. 1-3, the fluid flow recess 24 may be generally semicircular in shape. In other embodiments, the fluid flow recess 24 may not be semicircular, but may be generally curved. The fluid flow recess 24 may extend into the axial diffusor 22 between about 10 percent and about 50 percent of the axial length of the axial diffusor 22.

The turbine engine 10 may also include a wave protrusion 28, as shown in FIGS. 2 and 3, extending from the surface 30 forming a radially inward side of the axial diffusor 22. The wave protrusion 28 may increase the efficiency of the turbine engine 10 by reducing fluid flow losses in the plenum 12. The wave protrusion 28 may be aligned circumferentially with the fluid flow recess 24. The wave protrusion 28 may be positioned on an opposite side of the axial diffusor 22 from the fluid flow recess 24. The wave protrusion 28 may be positioned axially upstream from the fluid flow recess 24 such that the wave protrusion 28 is generally aligned with the fluid flow recess 24. In such a position, the size cross-sectional area of the opening 46 between the fluid flow recess 24 and the wave protrusion 28 may be about the same as a conventional configuration. However, the combination of the fluid flow recess 24 and the wave protrusion 28 provides enhanced fluid flow with reduced losses because of the configuration, thereby increasing the efficiency of the turbine engine. In at least one example in which the fluid flow has been modeled, the instant invention reduced the plenum 12 loss by about 20 percent.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine engine, comprising:
a combustor;
a compressor positioned upstream of the combustor;
at least one transition channel forming at least a portion of a plenum between the compressor and the combustor;
a shell forming at least a portion of the plenum between the compressor and a combustor portal of the combustor and positioned around the at least one transition channel;
an axial diffusor protruding from a downstream wall of the shell toward the at least one transition channel; and
wherein the axial diffusor includes a fluid flow recess in a trailing edge of the axial diffusor, wherein the fluid flow recess is formed from a surface extending linearly outwardly from the radially outward wall forming the axial diffusor.

2. The turbine engine of claim 1, wherein the axial diffusor protrudes generally upstream from the downstream wall of the shell.

3. The turbine engine of claim 1, wherein the fluid flow recess in the trailing edge of the axial diffusor is positioned in close proximity to an outer surface of the at least one transition channel.

4. The turbine engine of claim 1, wherein the fluid flow recess is generally semicircular in shape.

5. The turbine engine of claim 1, wherein the fluid flow recess is aligned generally with the at least one transition channel.

6. The turbine engine of claim 1, further comprising a wave protrusion extending from a surface positioned radially inward of the axial diffusor.

7. The turbine engine of claim 6, wherein the wave protrusion is aligned circumferentially with the fluid flow recess.

8. The turbine engine of claim 7, wherein the wave protrusion is positioned axially upstream from the fluid flow recess such that the wave protrusion is generally aligned with the fluid flow recess.

9. A turbine engine, comprising:
a combustor;
a compressor positioned upstream of the combustor;
at least one transition channel forming at least a portion of a plenum between the compressor and the combustor;
a shell forming at least a portion of the plenum between the compressor and a combustor portal of the combustor and positioned around the at least one transition channel;

an axial diffusor protruding from a downstream wall of the shell toward the at least one transition channel;

wherein the axial diffusor includes a fluid flow recess in a trailing edge of the axial diffusor, wherein the fluid flow recess is formed from a surface extending linearly outwardly from the radially outward wall forming the axial diffusor; and a wave protrusion extending from a surface positioned radially inward of the axial diffusor.

10. The turbine engine of claim 9, wherein the axial diffusor protrudes generally upstream from the downstream wall of the shell.

11. The turbine engine of claim 9, wherein the fluid flow recess in the trailing edge of the axial diffusor is positioned in close proximity to an outer surface of the at least one transition channel.

12. The turbine engine of claim 9, wherein the fluid flow recess is generally semicircular in shape.

13. The turbine engine of claim 9, wherein the fluid flow recess is aligned generally with the at least one transition channel.

14. The turbine engine of claim 9, wherein the wave protrusion is aligned circumferentially with the fluid flow recess.

15. The turbine engine of claim 9, wherein the wave protrusion is positioned axially upstream from the fluid flow recess such that the wave protrusion is generally aligned with the fluid flow recess.

16. A turbine engine, comprising:

a combustor;

a compressor positioned upstream of the combustor;

at least one transition channel forming at least a portion of a plenum between the compressor and the combustor;

a shell forming at least a portion of the plenum between the compressor and a combustor portal of the combustor and positioned around the at least one transition channel;

an axial diffusor protruding from a downstream wall of the shell toward the at least one transition channel;

wherein the axial diffusor includes a fluid flow recess in a trailing edge of the axial diffusor, wherein the fluid flow recess is formed from a surface extending linearly outwardly from the radially outward wall forming the axial diffusor and the surface is curved around an axis extending radially outward and aligned with the surface; and a wave protrusion extending from a surface positioned radially inward of the axial diffusor.

17. The turbine engine of claim 16, wherein the axial diffusor protrudes generally upstream from the downstream wall of the shell and includes a fluid flow recess in a trailing edge of the axial diffusor.

18. The turbine engine of claim 17, wherein the fluid flow recess in the trailing edge of the axial diffusor is positioned in close proximity to an outer surface of the at least one transition channel and aligned generally with the at least one transition channel.

19. The turbine engine of claim 17, wherein the fluid flow recess is generally semicircular in shape and aligned circumferentially with the wave protrusion.

20. The turbine engine of claim 16, wherein the wave protrusion is positioned axially upstream from the fluid flow recess such that the wave protrusion is generally aligned with the fluid flow recess.

* * * * *